US012445867B2

(12) United States Patent
Chakraborty et al.

(10) Patent No.: US 12,445,867 B2
(45) Date of Patent: Oct. 14, 2025

(54) ARTIFICIAL INTELLIGENCE FOR COMMUNICATION MODE SUGGESTION

(71) Applicant: INTERNATIONAL BUSINESS MACHINES CORPORATION, Armonk, NY (US)

(72) Inventors: Aditi Chakraborty, Plano, TX (US); Saraswathi Sailaja Perumalla, Visakhapatnam (IN); Rachana Vishwanathula, Hyderabad (IN); Sweta Agarwal, Birpara (IN)

(73) Assignee: International Business Machines Corporation, Armonk, NY (US)

( * ) Notice: Subject to any disclaimer, the term of this patent is extended or adjusted under 35 U.S.C. 154(b) by 457 days.

(21) Appl. No.: 18/060,064

(22) Filed: Nov. 30, 2022

(65) Prior Publication Data

US 2024/0179538 A1 May 30, 2024

(51) Int. Cl.
*H04W 24/02* (2009.01)
*G06N 20/00* (2019.01)

(52) U.S. Cl.
CPC ............ *H04W 24/02* (2013.01); *G06N 20/00* (2019.01)

(58) Field of Classification Search
CPC .............................. H04W 24/02; G06N 20/00
See application file for complete search history.

(56) References Cited

U.S. PATENT DOCUMENTS

| 9,282,289 | B2 | 3/2016 | Alexandrov | |
|---|---|---|---|---|
| 9,699,271 | B2 | 7/2017 | Brander | |
| 10,462,238 | B1* | 10/2019 | Naganathan | H04L 67/535 |
| 10,645,088 | B1* | 5/2020 | Yanes | H04L 63/1425 |
| 11,006,077 | B1 | 5/2021 | Truong | |
| 11,265,183 | B1 | 3/2022 | Iyer et al. | |
| 11,516,036 | B1 | 11/2022 | Harathi et al. | |
| 2011/0307935 | A1* | 12/2011 | Kotecha | H04N 21/4331 725/119 |
| 2012/0323933 | A1 | 12/2012 | He | |
| 2018/0077099 | A1 | 3/2018 | Silva et al. | |
| 2018/0247459 | A1* | 8/2018 | Chui | H04N 7/0125 |
| 2020/0410453 | A1 | 12/2020 | Nalliah et al. | |
| 2021/0141933 | A1 | 5/2021 | Kochura | |

(Continued)

OTHER PUBLICATIONS

IBM, List of IBM Patents or Patent Applications Treated as Related, Appendix P, dated Dec. 5, 2022, 2 pages.

(Continued)

*Primary Examiner* — Brian J. Gillis
*Assistant Examiner* — Chhian (Amy) Ling
(74) *Attorney, Agent, or Firm* — Caleb D. Wilkes (57) ABSTRACT

A method, computer system, and a computer program product for generating a communication mode suggestion are provided. A first computer may receive a communication request from a first user to communicate with a second user. The first computer inputs the received communication request to a first machine learning model. The first machine learning model was trained with historical usage of the second user for communication of responses across multiple communication platforms. The trained first machine learning model generates the communication mode suggestion in response to receiving the received communication request as an input. The first computer transmits the communication mode suggestion for presentation to the first user.

20 Claims, 3 Drawing Sheets

(56) References Cited

U.S. PATENT DOCUMENTS

2021/0365806 A1* 11/2021 Sumanth ................ G06N 20/00
2022/0368745 A1 11/2022 Rajendran et al.
2023/0004713 A1 1/2023 Broussard et al.
2023/0129808 A1* 4/2023 Yu ........................ G06F 18/214
  709/206
2023/0281687 A1* 9/2023 Bhardwaj .......... G06Q 30/0609
  705/26.35

OTHER PUBLICATIONS

Pending U.S. Appl. No. 18/060,066, filed Nov. 30, 2022, entitled, "Artificial Intelligence for Meeting Management", 46 pages.
John Mese et al., "Method to filter notifications," IP.com Prior Art Database Technical Disclosure, IP.com No. IPCOM000235473D, Mar. 3, 2014, 2 pgs.
Disclosed Anonymously, "Suppression of Inconvenient Notifications," IP.com Prior Art Database Technical Disclosure, IP.com No. IPCOM000259215D, Jul. 19, 2019, 5 pgs.
Disclosed Anonymously, "System and Method for Smart Screen Sharing at Online Meetings," IP.com Prior Art Database Technical Disclosure, IP.com No. IPCOM000265546D, Apr. 23, 2021, 4 pgs.
Sheth, "Google Chrome will now automatically hide content of web notification while screen-sharing," thehindubusinessline.com, Jan. 26, 2021, 6 pgs., Retrieved from the Internet: <https://www.thehindubusinessline.com/info-tech/google-chrome-will-now-automatically-hide-content-of-web-notification-while-screen-sharing/article33664916.ece>.

* cited by examiner

ARTIFICIAL INTELLIGENCE FOR COMMUNICATION MODE SUGGESTION

BACKGROUND

The present invention relates generally to using artificial intelligence and computing programs to facilitate communication mode suggestions for a party trying to communicate with another party.

Communication platforms and modes abound implementing modern technology such as the Internet but can add complexity regarding a typical decision. A person often decides what is best way to communicate with another party and cause the other party to respond. Such decision complexity may abound for inter-organizational communications.

SUMMARY

According to one exemplary embodiment, a method for generating a communication mode suggestion is provided. A first computer may receive a communication request from a first user to communicate with a second user. The first computer inputs the received communication request to a first machine learning model. The first machine learning model was trained with historical usage of the second user for communication of responses across multiple communication platforms. The trained first machine learning model generates the communication mode suggestion in response to receiving the received communication request as an input. The first computer transmits the communication mode suggestion for presentation to the first user. A computer system and a computer program product corresponding to the above method are also provided.

With these embodiments, communication may be enhanced by harnessing the power of artificial intelligence which finds patterns from a user communication history. The communication efficiency and workplace efficiency may be enhanced by users finding best ways to communicate as preferred by a communication recipient.

In some additional embodiments, the communication mode suggestion may further include a best platform amongst the multiple communication platforms for the first user to communicate with the second user. The best platform may be selected from a group consisting of e-mail, a first instant messaging program, a telephone call, a paper message, and an in-person visit.

With these embodiments, a user may learn which platform another party prefers for communication. Therefore, the first party may subsequently choose to communicate with the other party in a manner which facilitates a quicker and more positive response from the other party.

In some additional embodiments, the first computer may perform an outage check of the best platform to confirm availability of the best platform before transmitting the communication mode suggestion to the first user. In response to the outage check finding the best platform is experiencing an outage, the first machine learning model may generate an alternative preferred platform from the multiple communication platforms for the first user to communicate with the second user. The alternative preferred platform is transmitted to the first user as part of the communication mode suggestion.

With these embodiments, communication technology examination may be added to the artificial intelligence-performed examination of the user history to find a best way for a user to communicate with another party. The current data may provide an improved communication suggestion as compared to what the historical data alone may indicate. a user may learn which platform another party prefers for communication. Therefore, with these embodiments the first party may subsequently choose to communicate with the other party in a manner which facilitates a quicker and more positive response from the other party.

In some additional embodiments, the machine learning model further generates an estimated response time for the first user to receive a response from the second user in response to the first user communicating with the second user according to the communication mode suggestion. In some additional embodiments, the communication mode suggestion includes a recommended time for the first user to send a communication to the second user.

With these embodiments, communication may be enhanced by helping plan a schedule for receiving a response from a communication recipient or for sending a message to the recipient. Therefore, with these embodiments the first party is provided with timing information which can help them develop a schedule to accommodate the intended communications.

BRIEF DESCRIPTION OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The following described exemplary embodiments provide a method, computer system, and computer program product for determining a best way for one party to communicate with another party. A first person may have multiple options available for communicating with a second person. The first person may have various communication platforms available for communicating such as electronic mail ("e-mail"), one or more instant messaging platforms, e.g., instant messaging of a social media platform or an enterprise communication platform, telephone, video conferencing, physical mail delivery, and in-person discussion. Choosing between the different communication options may add complexity to a common decision. Using artificial intelligence and machine learning to determine a best mode of communicating with a particular party and of doing so in a way which is most likely to generate a quick and meaningful response from the particular party may simplify the communication decision, speed up communication exchanges, and facilitate productivity.

The present embodiments implement artificial intelligence and machine learning to achieve these results. A party may receive a communication mode suggestion from the artificial intelligence/machine learning model which helps the party know the best and/or most effective way to send a message to another party. The communication mode suggestion may in at least some embodiments include a best communication platform and may include timing information such as an optimal time to send a message to a particular party and an expected time for receiving a response from the party if a particular suggestion is followed. The machine learning model takes advantage of historical usage, responsiveness, availability, etc. of a particular user and their communication responses across multiple communication platforms in order to learn a best way for others to communicate to that particular user. Thus, the present embodiments enhance the library of communication software programs.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
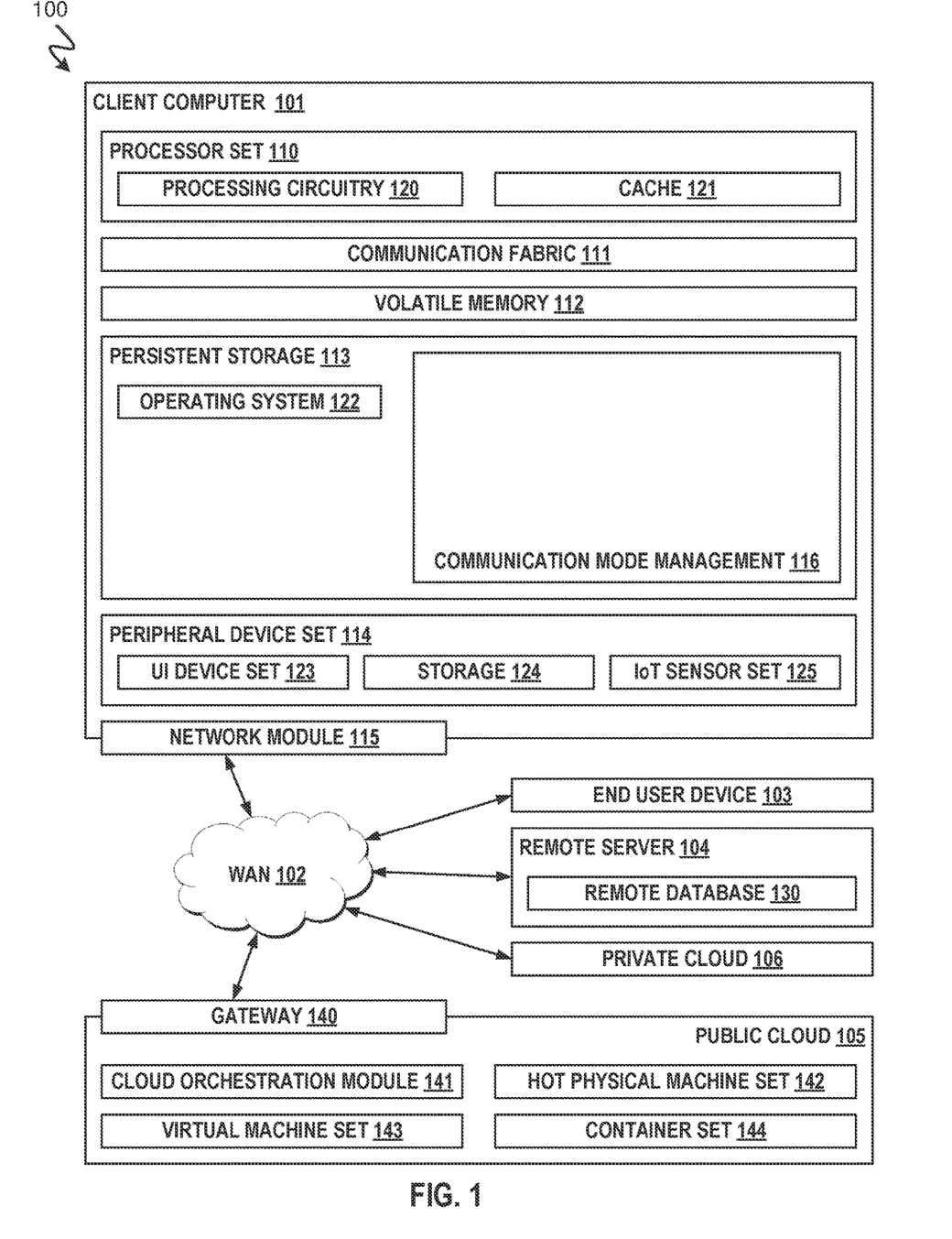
FIG. 1 illustrates a computing environment in which communication mode management according to at least one embodiment may be implemented.

Computing environment 100 contains an example of an environment for the execution of at least some of the computer code involved in performing the inventive methods such as communication mode management 116. In addition to communication mode management 116, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and communication mode management 116, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in communication mode management 116 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in communication mode management 116 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way. EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

It should be appreciated that FIG. 1 provides illustrations of some implementations and does not imply any limitations with regard to the environments in which the communication mode management may be implemented. Many modifications to the depicted environments and structures may be made based on design and implementation requirements.

Figure 2:
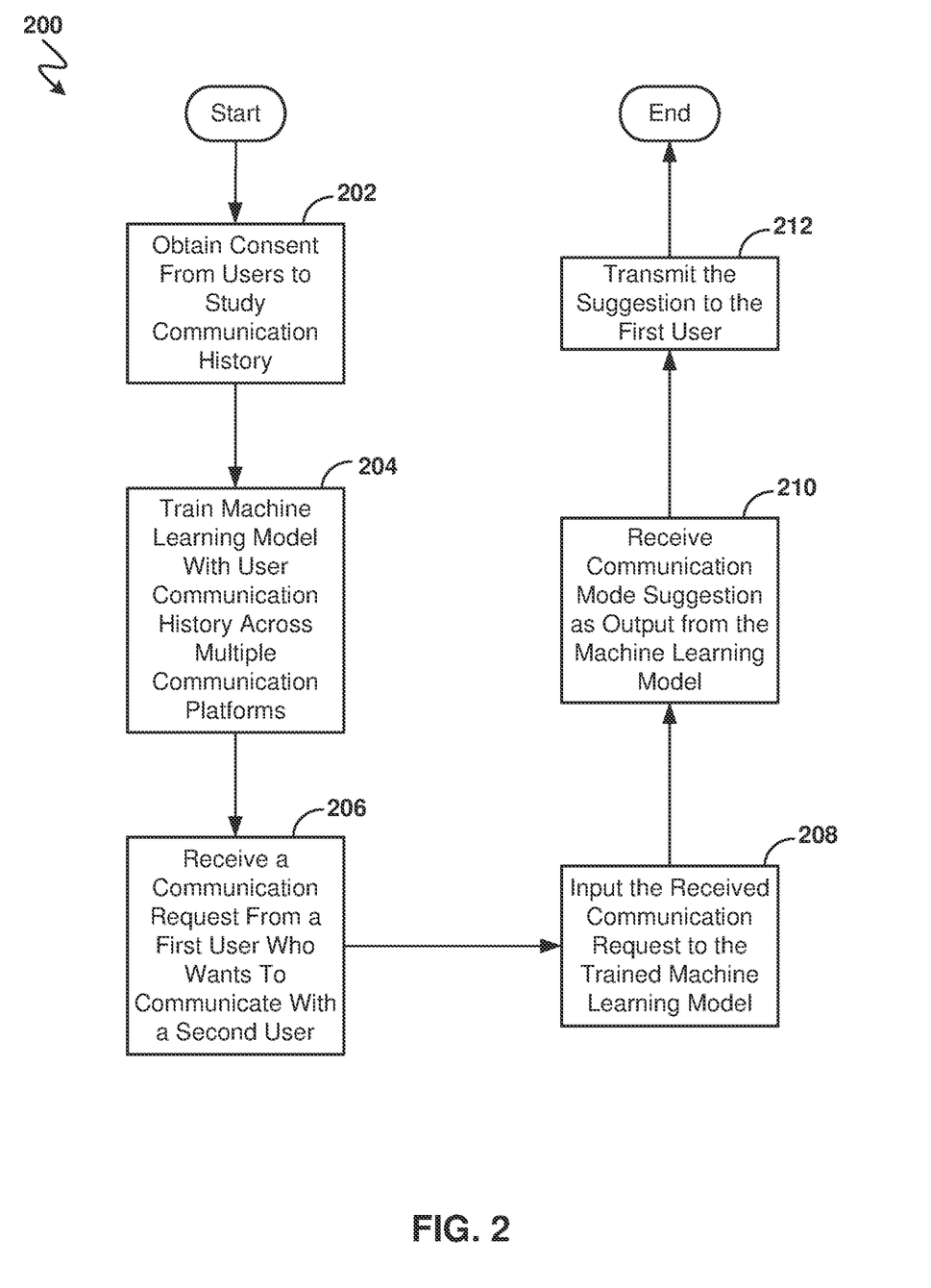
FIG. 2 is an operational flowchart illustrating a communication mode management process according to at least one embodiment.

Referring now to FIG. 2, an operational flowchart depicts a communication mode management process 200 which, according to at least one embodiment, is performed within the computing environment 100 and/or using aspects of the computing environment 100 such as the communication mode management 116. The communication mode management 116 may include and/or generate various modules, user interfaces, and services, and may use data storage when the communication mode management process 200 is performed.

In a step 202 of the communication mode management process 200, consent is obtained from one or more users to study their communication history. This communication history may include their electronic communication history. Users may be electronically sent an authorization form which they may execute and sign in order to authorize gathering and study of their communication history. The communication mode management program 116 may receive the executed consent and, in response, download a communication history for the consenting party. The communication history may, for example, include histories such as instant messaging conversations, email conversations, telephone records, office visits, etc. The histories may include information such as identities of communication parties involved, timing such as time, day, week, month, etc. of received inquiries and of provided responses, and at least some content of the inquiries and responses. The historical usage may include time zones of the parties involved in the past communication including the time zone of the consenting party. The historical usage may include daily personal calendars for the consenting party with work-related tasks, absences, and meetings for the consenting party that the party had or completed on a particular past day. Telephone records may include a number of calls taken compared to a number of calls received. The telephone records may indicate the length of times of taken calls. Office visits may indicate a record of in-person visits received, declined, and/or postponed and amount of time taken for an in-person discussion. Such visit records may be captured from records stored electronically or via data entry of manually-kept records.

In some instances, an organization such as a company may encourage its members to join in and register for the communication mode management program 116 so that intra-organization communication may be enhanced. In such instances, communication histories may in some embodiments be restricted to the organization-related communications.

In other instances, a user may consent to allow other personal communication histories to be accessed by the communication mode management program 116. In this way, the communication enhancement benefits may be provided for potential communicating parties from a variety of relationships. For example, the communication histories may be accessed from e-mail accounts, social media accounts, chat platforms, or other communication environments. In some instances, the user may give restrictions about which other parties and people may use the communication mode management program 116 to receive a suggestion for a best communication mode. For example, the user may restrict the use to other known friends or acquaintances. In some instances, a user may grant, on a case-by-case basis, access to others to use the program 116 for receiving the suggestion regarding this user. Such case-bycase requests may be handled via electronic notifications and/or messages sent from the program 116 to the user, e.g., at the client computer 101 or at an end user device 103.

The consenting party may in some embodiments upload the communication history from an end user device 103 that communicates with a main client computer 101 which hosts the communication mode management program 116. In some embodiments, a database with user communication history may be stored at the main client computer 101 or with a remote server 104 which holds additional computer memory for data storage. Such remotely-stored database may be accessed via end user device 103 or via the client computer 101 via a network communication through the wide area network 102.

Any necessary additional consent may be requested and taken at every stage of the applications that are involved. During initial setup and/or registration with the communication mode management program 116 the user is given the flexibility to define what kind of access is provided from the communication applications and the communication histories. User privacy is valued and compliance with the user-defined privacy parameters is carried out. The communication mode management program 116 will follow any applicable regional, national, international, etc. privacy compliance standards so that the users can be assured the system is compliant to a certain security standard and follows governance rules for the data that is being captured.

In a step 204 of the communication mode management process 200, a machine learning model is trained with user communication history across multiple communication platforms. This history may be the history that was gathered in response to obtaining the consent in step 201. The communication history may be submitted for the training of step 204 in communication interaction sets that include first inquiries to a receiving party and the corresponding responses generated by the receiving party in response to those inquiries. The machine learning model that is trained may be stored at least in-part on computer 101 or on another server such as the remote server 104 in the cloud. The remote server 104 communicates with the computer 101 via the wide area network 102.

In some embodiments, the updating of the machine learning model occurs frequently, e.g., daily for the user. In this way, the machine learning model can be up-to-date, for example, with current schedule and work task information for the particular user. On a repeated basis, the daily calendar and current work tasks of a participating user may be submitted to update the communication history database for this user, and as part of step 204 may be used for additional training and refining of the machine learning model for this user.

Any machine learning model used for various steps of the communication mode management process 200 such as for the training of step 204 may include naive Bayes models, random decision tree models, linear statistical query models, logistic regression n models, neural network models, e.g. convolutional neural networks, multi-layer perceptrons, residual networks, long short-term memory architectures, algorithms, deep learning models, and other models. The training a machine learning model may include providing training data (such as the communication histories, or otherwise, as discussed herein) to a learning algorithm or to a machine learning algorithm. The training data may be labeled by a domain expert, or unlabeled in the case of unsupervised machine learning. The machine learning model is the model structure or system that is created by the training process. The training data, in various embodiments, should include targets or target attributes which include a correct answer such as a mode of response used based on the current work and business conditions for the user on a particular day. The correct answer may further include answers which had the quickest time for a response and/or a congenial response. The learning algorithm finds patterns in the training data in order to map the input data attributes to the target. The machine learning model is trained to recognize these patterns so that the answer can be predicted for similar future inputs. A machine learning model may be used to obtain predictions on new data, e.g., a new communication request at a particular time, day of the week, month, year, etc., for which the target is unknown. The machine learning model uses the patterns that are identified to determine what the target is for new data without a given answer. Training may include aspects of supervised (particularly in the case of labeled training data) and/or unsupervised learning (in the case of partially labeled or unlabeled training data).

Various commercial platforms exist to allow a machine learning model to be created or trained. The training may include selecting data types, uploading data, selecting class types, and allowing a commercial system to then train the data. Such data upload may occur at the computer 101 or at another computer associated with the remote server 104.

A separate respective machine learning model may in some embodiments be trained for multiple different users because each user can have different preferences for responding to messages.

In a step 206 of the communication mode management process 200, a communication request from a first user to communicate with a second user is received. A user of the computer 101 or of another end user device 103 may transmit this communication request to the program 116. For the communication mode management process 200 to succeed, the desired party for communication, in the above example the second user, needs to have had their communication history studied and fed to the machine learning model in step 204.

The communication request of step 206 may include an indicator of the identity of the party with whom the requestor would like to communicate. The program 116 may communicate with the computer that hosts the machine learning model for the particular party desired to be contacted. The program 116 may have a database of storage locations for various machine learning models or may have communication access to another program, e.g., at another computer, which has such a database.

In a step 208 of communication mode management process 200, the received communication request is input to the trained machine learning model. This machine learning model is the model that was trained in step 204. After finding the location of the machine learning model, the communication mode management program 116 may input the communication request into the machine learning model. The communication request may include one or more elements from the group of an identity of the requesting party, a role, e.g., an organizational role or position, of the requesting party, a day and time, a content type of the intended message, some or all of the content of an intended message, and a time zone of the requestor.

In a step 210 of the communication mode management process 200, a communication mode suggestion is received as output from the machine learning model. This output is generated in response to the inputting that occurs in step 208. This suggestion may include various elements such as a best platform amongst the multiple communication platforms for the first user to communicate with the second user. The best platform may be selected from a group consisting of e-mail, a first instant messaging program, a telephone call, a paper message, and an in-person visit. Other elements of the communication mode suggestion may include an estimated response time for the first user to receive a response from the second user in response to the first user communicating with the second user according to the communication mode suggestion. For example, the communication mode suggestion may indicate that a best platform is e-mail and an estimated answer time for receiving an e-mail response from this user is a range of thirty to forty-five minutes. Other elements of the communication mode suggestion may include a recommended time for the first user to send a communication to the second user. For example, a user may respond more quickly to new emails that arrive within a morning time period of the user.

In some embodiments, the communication mode suggestion may include a content modification suggestion for the intended message content. The communication history may indicate examples of the user providing a negative and/or adversarial response, and the machine learning model may find common conditions and common content/word choice of messages when such responses were generated. The communication mode suggestion may suggest to avoid certain catch phrases and/or formatting that may trigger a negative response. The communication mode history may also provide a recommendation about a length of message and may indicate that messages of a shorter length have an increased chance of receiving a quick and helpful reply. The content modification suggestion may be generated as a machine-recognized way for the first party to facilitate a quicker and/or more favorable response from the desired second party.

In some embodiments, the communication mode suggestion may include a content file type suggestion based on whether the intended recipient prefers a message in a body of an email, in a word processing attachment, in a portable document format ("PDF") attachment, etc. Such a content file type suggestion may be based on various factors from the user communication history such as content file type used by the intended recipient in their messages to others and on observed response times for the intended recipient to reply to messages having various content file types.

In some embodiments, the communication mode suggestion generated by the communication mode management program 116 may indicate that no response would be expected from a particular user for a particular time interval. Such indication may be provided if current party data retrieved by the communication mode management program 116 indicates that the desired party for communication is out of the office, is swamped with urgent tasks, etc.

In a step 212 of the communication mode management process 200, the communication mode suggestion that was generated in step 210 is transmitted to the first user. This transmission may occur via the WAN 102 to an end user device 103 associated with the requesting party. Upon receipt of the transmission, the end user device 103 may play the suggestion for the user so that the user can better decide how to contact the second party. The playing may occur via text display on a display screen of the end user device 103 or other computer and/or may occur via an audible display of audio that provides the suggestion.

The program 116 may consider the context of the message and type of the message being shared and recommends a platform over which the receiver might prefer the information at that point of time when the sender is trying to reach receiver for some details or to communicate information to the receiver for consideration. In one embodiment, based on one or more of the context of the message, the type of message, the current calendar of the receiver, and the current tasks of the receiver as, for example, indicated in project management tools, a suggestion is generated that recommends the time of the day the receiver is available for faster response.

In some embodiments, the communication mode management program 116 investigates for scenarios where platform outages/updates which relate to the communication mode suggestion might have occurred. The communication mode management program 116 may perform a cross platform search and understand the user availability on various communication platforms. If one platform is down, the program 116 may recommend an alternative platform to use for communication. Referring to the communication mode management process 200, an outage check of the best platform to confirm availability of the best platform may in some embodiments occur in between steps 210 and 212. Thus, the platform availability check may in some embodiments be performed before transmitting the communication mode suggestion to the first user. The platform availability check may in some embodiments be performed by sending test messages through the platform. For example, the communication mode management program 116 may send a message from one program-controlled account to another program-controlled account on a particular communication platform. Successful receipt of the message within a specified time interval may be taken as a confirmation of platform availability. No receipt of the message or receipt of a message after a time interval exceeding a pre-defined threshold may be understood as a platform outage by the communication mode management program 116. In response to the outage check finding that the best platform is experiencing an outage, in some embodiments the trained machine learning model generates an alternative preferred platform from the multiple communication platforms for the first user to communicate with the second user. This alternative preferred platform is transmitted to the first user as part of the communication mode suggestion of how best to communicate with the second user.

In one embodiment, the communication mode management program 116 and/or its trained machine learning model considers the time zones of the sender and receiver, a historical response pattern, and/or job or role type for determining a best mode to reach a particular party and a best time or time interval for sending the message to the particular party. The best time may include the incentive of causing the receiver to more quickly respond if the receiver follows historical personal tendencies. For example, if a person works in shifts the communication mode management program 116 may recommend sending an email rather than a casual instant messaging ping in an instant messaging application. In another example, for a person who is a network administrator and has a majority of work that depends on remote access and virtual machines, the communication mode management program 116 may recommend reaching this worker via email or by using a desk phone number for time-critical communications. Understanding user behavioral pattern from the data, e.g., by training a machine learning model with the historical communication data (as further discussed herein), the communication mode management program 116 which may use and/or access a trained machine learning model may define a user fingerprint to understand availability and tendency of a user to respond at a specific point in time based on the schedule of the user. Recommendations for best communicating with this worker may be generated based on the user fingerprint. The recommendations may include a type of message, a message platform, and/or message content modifications.

In some embodiments, the communication mode management program 116 may also implement some screen sharing privacy features for implementation during screen sharing that may occur in virtual meetings between two or more meeting participants. Such privacy features may be implemented with and/or may involve one or more of the following steps and/or actions:

1. A user signs up for the communication mode management program 116 and receives a unique identifier to differentiate the user within the communication mode management program 116 and its data storage.
2. If the user is in a meeting and has started screen sharing with their particular computer so that contents of the display screen of this first user are sent to be displayed at the screens of other users, the notifications/alerts/messages received at the computer of the first user which are not relevant to the discussion in the meeting will not be shown and be blocked, delayed, or blurred by the communication mode management program 116 on the computer of the first user.
3. If the user is in a meeting and has started screen sharing, the items on the screen other than what is being presented will be masked/blurred by the communication mode management program 116 after the communication mode management program 116 receives content of the meeting and understands the context of meeting. The program 116 may generate and play on the computer screen an option for the user to unmask/unblur the other material, e.g., via performing a click, or equivalent means.
4. If the user is trying to reach someone (a person referred to as a "receiver") on messaging media, if the receiver is in another meeting and is sharing his or her screen, the sender is given an alert regarding the busy, occupied state of the intended receiver. If, however, the message of the sender is relevant to what is being presented by receiver, the message will be shown on the computer of the receiver after the program 116 checks user profile preferences for the user. The communication mode management program 116 may perform natural language processing and optionally optical character recognition on the contents of the message in order to determine relevancy to the current meeting. The communication mode management program 116 may in some embodiments perform semantic similarity with vector comparison in order to determine relevancy of the incoming message to the current meeting topics.
5. If a sender is trying to send something to receiver, the communication mode management program 116 analyzes the content of the intended message. Based on this analysis, the communication mode management program 116 generates a recommendation of the platform that receiver will prefer for that content. The communication mode management program 116 may transmit that recommendation to the sender, e.g., as a part of the communication mode management process 200.
6. If a sender is trying to send something to receiver, the content of message, the time at which the message is being sent, and the current tasks listed for the receiver on project management tools and/or on a calendar of the receiver are analyzed by the communication mode management program 116. The communication mode management program 116 may in response generate a recommendation of the time at which receiver is expected to take that message. This recommendation may be transmitted to the sender for playing and informing the sender.
7. If the sender has sent something to the receiver and the sender has received no response from the receiver for a time period that is larger than a predefined time limit, the communication mode management program 116 may perform a cross platform search to analyze if the receiver is facing any outage/updates and upgrades for certain communication applications. If an outage for the used platform is discovered, the communication mode management program 116 may determine and recommend a next best application to reach the receiver.
8. If the receiver has a busy schedule with many tasks to do and this information is input into the communication mode management program 116, e.g., into the trained machine learning model, from the past patterns the machine learning model may learn that the receiver usually snoozes notifications during such situations. The communication mode management program 116 may automatically snooze the notifications/alerts intended for the busy person. Meanwhile, the communication mode management program 116 may also generate a response for the intended sender that indicates the current unavailability of the receiver for considering the intended message.
9. If a sender is sending a message to receiver, the communication mode management program 116 may understand a mood of the receiver by analyzing various factors such as word tones and vocabulary choice of messages and/or conversations of the receiver. Based on a sour mood of the receiver, the communication mode management program 116 may recommend a different wording for the message content and may send this proposal to the sender.

In one privacy-related embodiment for virtual meeting software that may include screen sharing, the communication mode management program 116 may include virtual meeting software and with this software may include certain privacy features. The privacy features may include displaying additional information on the screen of a meeting participant based on the role of the participant within the meeting. In some instances, the communication mode management program 116 may invoke privacy settings for a party currently performing screen sharing on their computer while removing the privacy settings for parties that are not screen sharing or are receiving the shared screen of another user. The privacy features may analyze information and on a screen-shared computer display information that is relevant to the meeting, e.g., to a current context of the meeting, but may block and/or blur irrelevant content that is irrelevant to the meeting, e.g., to a current context of the meeting. Thus, a party who is a host of the virtual meeting but is not current screen sharing may have other applications open and receive other notifications, but a meeting participant who is currently screen sharing will have other applications reduced, closed, and/or blurred and will have incoming notifications blocked if those are irrelevant to the meeting content. Thus, incoming information may be protected selectively and dynamically.

For example, if a participant A is the host of a virtual meeting and participant B is currently doing a screen share for that virtual meeting, the communication mode management program 116 may allow incoming messages to participant A to continue to be displayed on the display screen of the computer of participant A based on set preference alert mechanisms for participant A. If, however, the communication mode management program 116 identifies that the meeting has shifted so that participant A instead of participant B begins to screen share, the communication mode management program 116 adjusts the incoming messages and notification settings for the computer of participant A so that these messages are blurred and so that notifications are repressed. If the computer that is screen sharing changes dynamically, the communication mode management program applies message and notification privacy, suppression, blocking, and/or blurring rules based on alert mechanism for the current person presenting and screen sharing and other meeting participants can then continue to receive messages in regular fashion.

In some embodiments for the privacy features of virtual meeting software, the communication mode management program 116 may consider (1) the context of how the user is using the computer and if the user is currently performing screen sharing in a virtual meeting and (2) a meeting agenda to determine which information on the screen to blur. For example, if a virtual meeting participant is sharing the screen and needs to search through apps on the computer to find particular content, the communication mode management program 116 may compare displayed content of other open applications to determine relevancy to the current virtual meeting and may blur all apps and displayed information that are not relevant to the current virtual meeting. e.g., that are not relevant to any agenda item of the current meeting. In some instances, a graphical user interface token will be generated and displayed to give the user a chance to actuate same to override the blurring so that blurred portions or the entire contents shown on the screen display may be transmitted for screen sharing.

In at least some embodiments, the communication mode management program 116 performs privacy function during screen sharing in a virtual meeting by blurring or blocking content display for the screen share transmission until explicit approval of the display is given. Thus, in some embodiments during a virtual meeting the communication mode management program 116 records audio spoken as part of the virtual meeting and/or records words typed as part of the virtual meeting and searches for display authorizations. For example, software developers hold a virtual meeting together and discuss the design of a project feature. The lead of the virtual meeting is sharing the contents on his or her computer to explain the flowchart and workflow steps in a digital content slides file. During the discussion, the lead navigates on his or her computer screen to move from one screen to another to show other relevant content such as EPIC or Requirement documents. The communication mode management program 116 will prevent transmission of content display of a mailbox application that is open on the screen of the virtual meeting lead. This prevention is carried out unless the lead speaks and/or types and/or actuates to give approval to the communication mode management program 116 to transmit display of this mailbox application or a portion of same.

For example, while trying to find a file, the lead whose computer is performing a screen sharing transmission to the computers of other virtual meeting participants may traverse screen contents by typing 'Alt+Tab' or 'Cmd+Tab' or 'Cmd+twiddle' and certain aspects of the virtual mail inbox of the lead would, if the privacy feature of these embodiments were unavailable, be visible over the screen sharing. The privacy feature helps avoid the unintended sharing of information from one or more email messages in the mailbox application which may contain confidential information. Such confidential information may be present even in a subject line of an email. Such confidential information may relate to a potential promotion, hiring/firing decision, and/or salary hike which should not be shared with other virtual meeting participants. Such confidential information is at risk for other leadership or sales-related meetings. In these embodiments, the communication mode management program 116 generates additional privacy for the screen sharing computer so that the content of applications or other information are not transmitted for screen sharing display on other computers while the screen sharing party is navigating through open relevant applications on their computer screen for that discussion.

With the above-described privacy features for screen sharing during a virtual meeting, these embodiments of the present disclosure support remote communication aspects while users are connected in a collaboration platform. These embodiments help avoid the distraction that incoming messages might cause a meeting participant if the incoming messages were not delayed and/or blocked. These embodiments use techniques of analysis by artificial intelligence on context of a meeting and presenter aspects of the meeting to segregate and filter information that should not be displayed during the meeting to computers on a receiving end of screen sharing.

In some embodiments, the communication mode management program 116 considers various inputs such as a user or group calendar feed, a meeting agenda, and/or identities of meeting participants to dynamically establish and enforce rules for information display privacy, for notification display privacy, and/or for distraction avoidance that are relevant for when arriving messages from any communication platform such as an instant messaging platform and/or via email are displayed and shown at a computer that is currently participating in a virtual meeting. Privacy rules may be applied to avoid confidential, trivial, and/or irrelevant information from being transmitted as a part of screen sharing. Distraction avoidance filters may be applied for screen sharing receiver computers and/or any computers participating in a virtual meeting. The distraction avoidance filters may temporarily block and/or delay incoming notifications and/or messages on a computer until a virtual meeting is finished. Distraction avoidance filters with respect to incoming messages and/or notifications may also be applied for any computer if the computer user has a full daily calendar or urgent tasks that are past or near a deadline.

The communication mode management 116 may invoke one or more techniques such as data storage, artificial intelligence such as optical character recognition, visual recognition, natural language processing, logic building, contextual understanding, relevancy scoring, and deep learning such as convolutional neural networks and recurrent neural networks, ranking and prioritization, push notifications, and predictive analytics to perform the communication mode management and/or virtual meeting privacy management features described herein.

Figure 3:
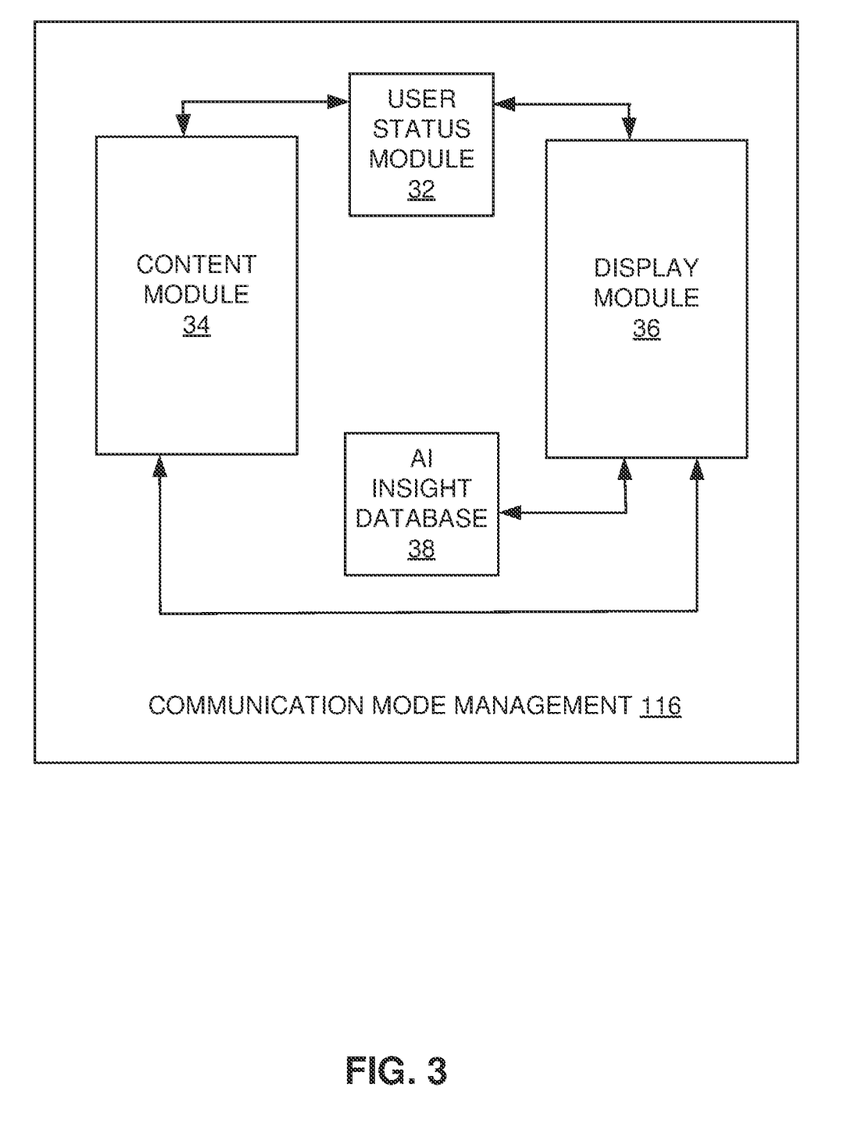
FIG. 3 illustrates details of a communication mode management program according to at least one embodiment.

FIG. 3 illustrates details of a communication mode management program 116 according to at least one embodiment. Specifically, the embodiment of the communication mode management program 116 shown in FIG. 3 includes various modules and databases for performing various functions such as the privacy-related features described above. This embodiment of the communication mode management program 116 includes a user status module 32, a content module 34, a display module 36, and an AI-insight database 38.

The communication mode management program 116 may characterize computers seeking to communicate with other computers. The characterization may be based on a meeting role of a participant in a virtual meeting. The characterization may be based on a communication role for a party seeking to communicate with another party using the computers. One type of characterization is for a meeting role for a person/computer currently using their computer to screen share with one or more other computers as a part of a virtual meeting. Another type of characterization is for a meeting role for a person/computer designated as a current presenter for a virtual meeting. Another type of characterization is for a communication role for a person/computer trying to communicate with another person such as a presenter and/or person screen sharing their computer. Such communication attempt may occur through various communication platforms such as a social media communication platform. Characterizations may be fluid and change based on updated information received about current actions of the various computers/users. The communication mode management program 116 may provide certain features and/or functions based on the characterization.

The user status module 32 of the communication mode management program 116 may perform functions of (1) registering users who choose to participate with the communication mode management program 116, (2) assigning the user type dynamically based on the functionality the user is performing, and (3) capturing the status of the user. The user status module 32 of the communication mode management program 116 may transmit to and receive information/data from both the content module 34 and from the display module 36.

When a user wants to access and/or use the communication mode management program 116, the user may perform some steps such as accessing a website, downloading software of the communication mode management program 116 onto the used computer, and enter registration information into a website and/or software graphical portal via a displayed display screen and using input devices on the computer such as a mouse and/or keyboard. The communication mode management program 116 may ask via a graphical user interface for user information such as name, email address, password, etc. The communication mode management program 116 may assign a unique identifier for each user/registrant.

After registering, depending on the functionality that users are trying to perform the communication mode management program 116 tries to identify the user type and assign a type to the user. These may include characterizations described above such as presenters in a virtual meeting and parties attempting to people who are participating in a virtual meeting such as a presenter/screen sharer in a virtual meeting.

In addition to identifying the user type, the communication mode management program 116 may also attempt to identify the status of user. The communication mode management program 116 may offer various user statuses such as "IsInMeeting", "IsSharingScreen", and "IsIdle".

When the user state for a potential presenter is IsInMeeting, the user is in a meeting but not necessarily currently screen sharing for a meeting. When the user computer is providing a user status of "IsInMeeting", the computer may receive any type of notification including the notifications which are irrelevant to the subject of the meeting. However, if the user preferences are set to receive only contextual notifications while in meetings, the communication mode management program 116 may analyze content of incoming messages and/or notifications and meeting content, generate a similarity score, and allow display of the messages and/or notifications if the similarity score exceeds a threshold.

When the user state for a potential presenter is "IsSharingScreen", the user is in a meeting and is sharing the display screen via transmitting the contents through the internet for receipt and display by other computers participating in the virtual meeting. When this type of user state is identified, the communication mode management program enables privacy features, some of which were described previously and some of which are described subsequently. The privacy features may include functions of disabling irrelevant notifications, showing only relevant notifications, blurring out the unnecessary content on screen, and, when content is blocked or blurred out, giving an option to user to decide what is relevant to the meeting for display and what is not relevant to the meeting for display.

When the user state for a potential presenter is "IsIdle", the user is not in a meeting and is not currently performing screen sharing of the contents of their screen. The user may be doing routine work tasks. When this state is identified, the communication mode management program 116 may capture some compliant attributes to enable artificial intelligence-infused insights for the user. When user is idle, the communication mode management program 116 may disable virtual meeting privacy features for screen sharing. Therefore, displayed content does not need to be currently analyzed by the communication mode management program 116 which may save computing resources. Masking/blurring need not be performed. Distraction avoidance may nevertheless be implemented so that the communication mode management program 116 blocks notifications if a calendar analysis reveals a long task list for the user with deadlines less than a predetermined time threshold. Alternatively, no notification blocking may be performed and the user may receive the usual display of notifications from other software applications on the user computer.

For a user account of the type that is trying to communicate with another user, the communication mode management program 116 may offer various user states such as "IsInMeeting", "IsTryingToReachPresenter", and "IsIdle". The states "IsInMeeting" and "IsIdle" may be similar for the attempting communicator user type as they described above were for the potential presenter user type. The user state of "IsTryingToReachPresenter" may mean that the user is trying to reach someone who is presenting something in a virtual meeting. When recognizing this user state, the communication mode management program 116 may begin to evaluate contents of messages to determine if the one or more messages are relevant to the virtual meeting content such as the discussed topics and digital content being presented. Based on a degree of relevancy, the content will be displayed and/or blocked/delayed on the computer of the user who is presenting. If the content is irrelevant, the content may be blocked during the virtual meeting or during the screen sharing portion of the virtual meeting. In some embodiments, the communication mode management program may also perform additional tasks such as generating and presenting an alert to the presenter computer if the content is not relevant to the virtual meeting content, recommending a channel of communication, and/or recommending a better time at which the presenter is available for receiving and possibly reading a message.

The content module 34 of the communication mode management program 116 may perform functions of (1)

gathering digital content for evaluation, (2) evaluating digital content, and (3) generating decisions about display of certain content based on the evaluation. The content module 34 of the communication mode management program 116 may transmit to and receive information/data from both the user status module 32 and the display module 36.

The content module 34 may generate one or more graphical user interfaces to request and receive consent from the registering users. In this aspect the content module 34 gives a user flexibility to define what applications and their communication histories may be accessed by the communication mode management program 116. Applications which the communication mode management program 116 may access and ask for consent to access may include (1) social media platforms, (2) applications that generate push notifications and alerts such as browsers, calendars, reminders, and alarm applications, and (3) general applications such as code editors, terminals, and/or personal applications such as music/sticky notes etc. on the personal computer. Once the user defines the access and consent, the communication mode management program 116 stores and registers the consent and registration data received. The content module 32 may allow retrieval of this stored data for use during other functions of the communication mode management program 116.

In some embodiments, one sub-module of the content module 32 is a screen content sub-module. The screen content sub-module may capture content displayed on a display screen of the computer of a program user. The screen content sub-module may also check the user type, state, access and consent data. If the user type is a presenter and the user state is IsSharingScreen, screen content sub-module may begin to capture some or all of the content displayed on the screen. The captured content may include various file formats such as .docx, .xlsx, .pptx, .mp3, and .mp4 file formats. The screen content sub-module may perform text analysis with natural language processing and may perform optical character recognition of images displayed with text images. For a user type that is an attempting communicator, the screen content sub-module may capture the content of a message that is intended to be transmitted to another user computer. Various file formats such as those mentioned above may also be accessed by the screen content sub-module for this user type. Capture data may be stored in data storage that is part of or accessible to the communication mode management program 116. This captured content may relate to content of a virtual meeting.

Once the content is captured, the content module 32 may perform various techniques for some embodiments to understand and analyze the captured content. To extract the text from images from slides, the content module may perform optical character recognition. Visual recognition may be performed on images. Video may be submitted to a convoluted neural network and/or to a recurrent neural network to extract each frame of image. From an extracted individual frame, the frame may be submitted to another recurrent neural network to extract the image meaning.

The content module 32 may similarly capture and extract content from incoming messages and/or notifications from applications to which the user has given access to the communication mode management program 116. Notifications displayed or to be displayed on the screen are captured. The notifications may include, for example, alerts, reminders, alarms, push notifications, and messages from other users from social media platforms.

The content module 32 may compare the meeting content with the incoming content. The comparison may be performed using natural language processing, text summarization, word cloud, semantic similarity vector comparisons, etc. to understand the similarity of the incoming messages to the meeting content. The content module 32 may perform logic building among various texts captured to understand the meaning within the content. Using these and similar techniques, the content module 32 may develop a contextual understanding of captured content, may understand the correlation between the captured content of meeting and incoming messages, and may assign a relevancy score for the compared content.

Similarly, the correlation is calculated for every content displayed in a virtual meeting so that each incoming message or notification receives a relevancy score. A score threshold may be set in the content module 32. If the relevancy score matches or exceeds the pre-defined limit, then the incoming message or notification may be further passed for display on the screen of the user computer or to the display module 36 which may further decide about actual display on the display screen.

If the user is attempting to send a message to someone who is in a virtual meeting, the content of the hoped-for message is analyzed and a relevancy score of the hoped-for message to the meeting content is similarly determined. If the relevancy score matches or exceeds a pre-defined threshold, the message may be sent to the display module 36 in the computer of the attempted recipient. If the relevancy score is less than the pre-defined threshold, the user may be notified that the intended recipient is currently unavailable.

Thus, the content module 32 performs multiple functions such as capturing content, performing operations on the content, generating relevancy scores, and comparing to relevancy thresholds to determine which messages are sent to the display module 36.

The display module 36 of the communication mode management program 116 may perform functions of (1) generating responses, (2) displaying the responses on display screens of the computers, and (3) performing a generated response plan on one or more computer applications. The display module 36 may transmit messages and data to the user status module 32, to the content module 34, to the AI-insight database 38 and to external applications. The display module 36 may receive transmissions of messages and/or data from the user status module 32, the content module 34, the AI-insight database 38, and the external applications. The display module 36 may retrieve the access and permissions for every application involved. Depending on the application involved, on the user type, and on the user state, a course of action will be generated in the display module 36.

For example, if the user type of a participating user is presenter and the state is "IsSharingScreen", the fetched relevancy scores are confirmed as being above the pre-defined limit, then the application type is checked. If the operation is to display a message, alert, and/or a notification, then the message, alert, and/or notification may be displayed on the computer screen in the form with which the message, alert, and/or notification was received. If the application type is a code editor, a terminal, etc., then the display module 32 generates a course of action referred to as a response plan. The response plan may include masking the data or blurring out certain parts of data on the applications involved like code editors/terminals etc. The display module 32 may include sub-modules of generating response content and generating a response plan.

If the user type is for a party attempting to communicate, the user state is "IsTryingToReachPresenter", and the relevancy scores retrieved are above the predefined limit, the display module 32 will generate the response plan accordingly. This response plan may include displaying the message. If the relevancy score is not above the limit, a response message will be generated by the sub-module for generating response content that indicates unavailability of the intended recipient.

Based on the decided action, the display module 32 will show the response message to the different users using the sub-module for displaying a generated message. If the response plan is for using an external application such as a code editor or a terminal, the specified actions in the generated plan may be performed using a performing the course of action sub-module.

If multiple applications are involved, the display module 36 may also be responsible for prioritizing and ranking the course of actions and accordingly decide which should be performed first so that the user is not affected. At a given point in time, this display module 36 will decide which operation is crucial and accordingly prioritize. Thus, the display module 36 is responsible for generating message content, generating response plans, prioritizing the plans that are generated, and performing the response plans on the applications with access and permissions for all the users involved.

The AI insight database 38 may store output from artificial intelligence accessed by the communication mode management program 116. Using artificial intelligence may result in an enhanced user experience of the communication mode management program 116. The AI insight database 38 may access artificial intelligence such as a machine learning model that is stored elsewhere in the same computer such as the client computer 101 or in a remote server 104. Data may be captured from various application integrations because applications may generate notifications.

Due to some application access and communication history access being provided by the user to a wide range of applications, multiple attributes for the user and their communication patterns can be collected, analyzed, and modelled to provide some capabilities to the user. Such attributes may include time spent by the user on an individual application, a number of times each application is opened and closed, times of day at which the applications are used for longer duration, and/or types of information shared on types of platforms. Because some content is already being captured with respect to meetings and notifications, etc., that captured content will also be used in data modelling with the artificial intelligence. Individual blocks can be made for each attribute in the data storage of the AI insight database 38.

With the attributes collected, data models are created using artificial intelligence models and predictive analytics. The data models are specific to communication tendencies of a user. The insights/capabilities may include the recommendation of a best communication platform based on the context of message and the type of message being shared. The insights may further include a recommend time of day and/or particular day of the week the receiver might be available to read the message and respond to the message. Such timing recommendation may be based on the context of message, the type of message, the calendar of the receiver, and the tasks of the receiver from the project management tools. In cases of platform outages/updates etc., the communication mode management program 116 may perform a cross platform search and understand the user availability and may recommend a replacement platform for communication if one platform is experiencing an outage. The communication mode management program 116 may understand user behavioral patterns from the communication history data, may define a user fingerprint to understand a mood of the user at a specific point in time based on the current conditions, and based on the mood may recommend a type of content and message content modifications for users trying to communicate with the first user. Other patterns may be recognized such as user-consented message/alert/notification snoozing for some repeated patterns where the user repeated this task on multiple occasions.

The display module 36 may communicate with external applications that are being monitored by the communication mode management program 116 to perform a specific action on them. These software applications/programs could be in a variety of forms such as social media applications, enterprise communication applications, and/or any software that is installed on a personal computer such as code editors and terminals.

It may be appreciated that FIG. 3 provides an illustration of some embodiments and does not imply any limitations with regard to how different embodiments may be implemented. Many modifications to the depicted embodiment(s), e.g., to a depicted formulation of modules or communication exchange between modules, may be made based on design and implementation requirements. Steps and features from the various processes may be combined into the other processes that are described in other drawings or embodiments.

In one exemplary embodiment for privacy protection, a first user is in a virtual meeting with team members and is presenting something using screen sharing. This first user realizes that team member A has not joined the virtual meeting. The first user may open an instant messaging application on the computer and types and sends a message to the team member A asking if team member A will join the virtual meeting soon. Without the privacy protection, all previous conversations between the first user and team member A on the instant messaging application may be visible on the screen sharing and displayed to other team members who are participating in the virtual meeting. However with the privacy protection invoked, the first user may open the instant messaging application and the privacy features perform content analysis and allow only the recent conversation to be displayed over the transmitted screen shared content. The recent conversation refers to the question generated from the first user to the team member A asking them to come join the meeting.

In another exemplary embodiment for privacy, a party S is presenting to a client the latest progress made in the product. A team member R to the party S is constantly messaging party S to ask about an issue. Without the privacy protection features, notifications are displayed while party S shares the display screen with the client. The client may become bothered by the continuous message notifications. With the privacy protection features, however, the communication mode management program 116 allows relevant notifications related to the presentation of the latest progress made to the product to be displayed over the screen sharing. For example, a successful build notification may be transmitted but other messages are blocked from being transmitted for screen sharing to the client. Other messages may subsequently be displayed on the display screen of party S after the screen sharing and/or after the virtual meeting with the client is finished.

In one example for using the communication mode management program 116, a manager may be using a virtual meeting to present requirements to an engineering team.

While presenting the requirements, a manager may share discussion points he had with the customers. The manager says "Let me share the remaining discussion points that I had discussed in the last meeting with the customer". Without certain embodiments of the communication mode management program 116, the manager would need to go over multiple applications on his personal computer such as notes, calendar, and/or instant messaging application to find out the relevant discussion points and then share those to the larger audience. With these embodiments of the communication mode management program 116, however, natural language processing may be used to process the meeting contents including audio data recorded from the meeting comment made by the manager. Based on the understood request, the communication mode management program 116 may search the computer applications for the relevant data. After finding the relevant data, the communication mode management program 116 alerts the manager so that the manager may share the relevant notes to the larger application. This features saves time for the user and improves meeting efficiency.

In some embodiments, a computer-implemented method for automated management of a meeting may include a first computer receiving a meeting agenda for a first meeting, the first computer receiving live content from the first meeting, the first computer generating a meeting suggestion based on the meeting agenda and on the received live content, and the first computer transmitting the meeting suggestion to a second computer. The generating of the meeting suggestion may in some embodiments include inputting the meeting agenda and the received live content into a first machine learning model and, in response to the inputting, the first machine learning model outputs the meeting suggestion.

In some embodiments, the meeting suggestion is transmitted to a party who missed a part of the first meeting, and the meeting suggestion provides a summary of the missed part. An avatar may be generated and transmitted to the second computer along with the meeting suggestion. The avatar and the meeting suggestion may be transmitted in a manner such that the avatar presents the meeting suggestion on a display of the second computer.

Some embodiments may include additional steps and features of analyzing the received live content to determine meeting participation in the first meeting. The meeting suggestion may include a meeting participation standard based on the determined meeting participation. The meeting participation may include a response frequency of meeting participants of the first meeting. The meeting participation standard may include a recommended response frequency for the late-arriving party.

In some embodiments, the meeting suggestion relates to a second meeting that is subsequent to the first meeting. The meeting suggestion may include a missed agenda point that was not discussed in the first meeting. The missed agenda point may be transmitted to the second computer in response to a similarity score of the second meeting with respect to the first meeting exceeding a pre-determined threshold. The meeting suggestion may include one or more preparation tasks to perform in advance of the second meeting. A timing of the transmission of the one or more preparation tasks to the second computer may be based on an estimated time amount needed to complete the one or more preparation tasks. A timing of the transmission of the one or more preparation tasks to the second computer may be based on a user profile setting.

In some embodiments, the meeting suggestion may relate to an action item that was established in the first meeting. The meeting suggestion may include a missed agenda point that has not yet been discussed in the first meeting. The meeting suggestion may be transmitted before an end of the first meeting.

In some embodiments, the first computer may perform an automatic retrieval of digital content. The digital content may be selected based on the meeting agenda and on the received live content. The generating may include the first computer performing natural language processing on at least one of the meeting agenda and the received live content in order to generate the meeting suggestion.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for generating a communication mode suggestion, the method comprising:
   receiving, via a first computer, a communication request from a first user to communicate with a second user, the communication request including a first time zone of the first user;
   inputting, via the first computer, the received communication request to a first machine learning model, the first machine learning model having been trained with historical usage of the second user for communication of responses across multiple communication platforms and having been trained on historical time zones of the second user, wherein the trained first machine learning model generates the communication mode suggestion in response to receiving the received communication request as an input and by considering the first time zone of the first user and a second time zone of the second user; and
   transmitting, via the first computer, the communication mode suggestion for presentation to the first user.

2. The method of claim 1, wherein the communication mode suggestion comprises a best platform amongst the multiple communication platforms for the first user to communicate with the second user.

3. The method of claim 2, wherein the best platform is selected from a group consisting of e-mail, a first instant messaging program, a telephone call, a paper message, and an in-person visit.

4. The method of claim 2, further comprising performing, via the first computer, an outage check of the best platform to confirm availability of the best platform before transmitting the communication mode suggestion to the first user.

5. The method of claim 4, wherein in response to the outage check finding the best platform is experiencing an outage, the first machine learning model generates an alternative preferred platform from the multiple communication platforms for the first user to communicate with the second user and wherein the alternative preferred platform is transmitted to the first user as part of the communication mode suggestion.

6. The method of claim 1, wherein the first machine learning model further generates an estimated response time for the first user to receive a response from the second user in response to the first user communicating with the second user according to the communication mode suggestion.

7. The method of claim 1, wherein the communication mode suggestion comprises a recommended time for the first user to send a communication to the second user.

8. The method of claim 7, wherein the communication mode suggestion further comprises a best platform amongst the multiple communication platforms for the first user to communicate with the second user.

9. The method of claim 1, wherein the communication request comprises a current day and time and the first machine learning model uses the current day and time to generate the communication mode suggestion.

10. The method of claim 1, wherein the first machine learning model was further trained on daily calendars of the second user and finds relationships of the daily calendars to the historical usage of the second user for the communication responses across the multiple communication platforms.

11. The method of claim 10, wherein a present daily calendar of the second user is input into the first machine learning model to help generate the communication mode suggestion.

12. The method of claim 10, wherein the daily calendars comprise work tasks for the second user.

13. The method of claim 1, wherein the communication request comprises a content type of desired communication for the first user to communicate to the second user, and wherein the communication mode suggestion is further based on the content type.

14. The method of claim 1 wherein the communication request comprises intended message content for desired communication for the first user to communicate to the second user;
wherein in response to the received communication request being input into the first machine learning model, the first machine learning model further provides content modification suggestions for the intended message content, the content modification suggestions being based on the historical usages of the second user; and
wherein the communication mode suggestion that is transmitted to the first user comprises the content modification suggestions.

15. The method of claim 1, wherein a work role of the first user is input into the first machine learning model along with the received communication request, and the communication mode suggestion is further based on the work role of the first user.

16. The method of claim 15, wherein the first machine learning model is further trained on a work role of the second user and the communication mode suggestion is further based on a comparison of the work role of the first user to the work role of the second user.

17. A computer system for generating a communication mode suggestion, the computer system comprising:
one or more processors, one or more computer-readable memories, and program instructions stored on at least one of the one or more computer-readable memories for execution by at least one of the one or more processors to cause the computer system to:
receive a communication request from a first user to communicate with a second user, the communication request including a first time zone of the first user;
input the received communication request to a first machine learning model, the first machine learning model having been trained with historical usage of the second user for communication of responses across multiple communication platforms and having been trained on historical time zones of the second user, wherein the trained first machine learning model generates the communication mode suggestion in response to receiving the received communication request as an input and by considering the first time zone of the first user and a second time zone of the second user; and
transmit the communication mode suggestion for presentation to the first user.

18. The computer system of claim 17, wherein the communication mode suggestion comprises a best platform amongst the multiple communication platforms for the first user to communicate with the second user.

19. A computer program product for generating a communication mode suggestion, the computer program product comprising a computer-readable storage medium having program instructions embodied therewith, the program instructions executable by a computer to cause the computer to:
receive a communication request from a first user to communicate with a second user, the communication request including a first time zone of the first user;
input the received communication request to a first machine learning model, the first machine learning model having been trained with historical usage of the second user for communication of responses across multiple communication platforms and having been trained on historical time zones of the second user, wherein the first trained machine learning model generates the communication mode suggestion in response to receiving the received communication request as an input and by considering the first time zone of the first user and a second time zone of the second user; and
transmit the communication mode suggestion for presentation to the first user.

20. The computer program product of claim 19, wherein the program instructions are executable to further cause the computer to perform an outage check of a recommended platform of the communication mode suggestion to confirm availability of the recommended platform before transmitting the communication mode suggestion to the first user.

* * * * *